(12) United States Patent    (10) Patent No.:     US 8,011,404 B2
     Ishiyama et al.         (45) Date of Patent:     Sep. 6, 2011

(54) PNEUMATIC TIRE FOR MOTORCYCLE

(75) Inventors: Makoto Ishiyama, Kodaira (JP);
                Masafumi Koide, Hidaka (JP)

(73) Assignee: Bridgestone Corporation, Tokyo (JP)

( * ) Notice: Subject to any disclaimer, the term of this patent is extended or adjusted under 35 U.S.C. 154(b) by 708 days.

(21) Appl. No.: 12/064,692

(22) PCT Filed: Aug. 24, 2006

(86) PCT No.: PCT/JP2006/316617
     § 371 (c)(1),
     (2), (4) Date: Mar. 11, 2008

(87) PCT Pub. No.: WO2007/023902
     PCT Pub. Date: Mar. 1, 2007

(65) Prior Publication Data
     US 2009/0159164 A1    Jun. 25, 2009

(30) Foreign Application Priority Data
     Aug. 25, 2005  (JP) .................. 2005-245006
     Dec. 16, 2005  (JP) .................. 2005-363220

(51) Int. Cl.
     *B60C 9/18*   (2006.01)
     *B60C 9/22*   (2006.01)
     *B60C 9/28*   (2006.01)
(52) U.S. Cl. ........ 152/526; 152/531; 152/532; 152/533; 152/534; 152/535; 152/537; 152/538
(58) Field of Classification Search .................. 152/538, 152/526, 531, 532, 533, 534, 535, 537
     See application file for complete search history.

(56) References Cited

FOREIGN PATENT DOCUMENTS

| JP | 62-143705 A | 6/1987 |
|---|---|---|
| JP | 3-169713 A | 7/1991 |
| JP | 3-169717 A | 7/1991 |
| JP | 9-286204 A | 11/1997 |
| JP | 10-058917 A | 3/1998 |
| JP | 2001-039116 A | 2/2001 |

(Continued)

OTHER PUBLICATIONS

Japanese Office Action issued in Application No. 2007-532173 dated May 17, 2011.

*Primary Examiner* — Justin Fischer
(74) *Attorney, Agent, or Firm* — Sughrue Mion, PLLC

(57) ABSTRACT

A pneumatic tire for a motorcycle in which partial abrasion is suppressed by making the slip component of a tread lubber in the circumferential direction of tire as uniform as possible in the ground contacting plane. A cushion rubber layer 38 having elastic modulus lower than that of the tread rubber 30 is arranged on a spiral belt layer 22, and an inclination belt layer 24 including a cord inclining at an angle of 45 to 90 degrees to the circumferential direction of the tire is arranged on the cushion rubber layer 38. Consequently, shear deformation of the cushion rubber layer 38 during traveling can be transmitted to the tread rubber 30 after being smoothed by the inclination belt layer 24. As compared with a case not provided with the cushion rubber layer 38 and the inclination belt layer 24, shear deformation of the tread rubber layer 30 can be reduced relatively because shear deformation occurs in the cushion rubber layer 38 in place of the tread rubber 30; and since the slip component of the tread rubber 30 in the circumferential direction of the tire becomes substantially uniform in the ground contacting plane, partial abrasion can be suppressed.

9 Claims, 7 Drawing Sheets

FOREIGN PATENT DOCUMENTS

| | | | |
|---|---|---|---|
| JP | 2001-187514 | * | 7/2001 |
| JP | 2001-206009 A | | 7/2001 |
| JP | 2001-253207 A | | 9/2001 |
| JP | 2002-316512 A | | 10/2002 |
| JP | 2004-352010 A | | 12/2004 |
| WO | WO 92/12019 | * | 7/1992 |

* cited by examiner

PNEUMATIC TIRE FOR MOTORCYCLE

TECHNICAL FIELD

The present invention relates to a pneumatic tire for a motorcycle, and in particular to a pneumatic tire for a motorcycle provided with abrasion resistance suitable to a motorcycle.

BACKGROUND ART

A pneumatic tire for a motorcycle tends to expand in its diameter due to centrifugal force during rapid traveling and stability and durability during rapid traveling occasionally gets worse.

Therefore, in the recent years, as disclosed in the Patent Document 1 and the Patent Document 2, development of structure (so-called spiral structure) wound by steel and aromatic polyamide (KEVLAR: product name) in the circumferential direction of the tire progresses. Now tires with suppressed expansion of protrusion of the tire crown part during rapid traveling and enhanced stable performance during rapid traveling are supplied.

In addition, unlike the tire for passenger vehicles and trucks, the sectional plane of a tire crown part of the pneumatic tire for motorcycle looks like a round tire having smaller curvature radius than that of a tire for a four-wheeler due to the property of a motorcycle inclining its body to corner.

Therefore, in some ground contacting states, in the case where particularly large driving force works due to a position of the ground contacting part (a part brought into contact with the ground), slip distribution in the ground contacting plane becomes non-uniform so that the slip amount is likely to get different in particular in the center and the shoulder and partial abrasion causing rapid abrasion only in a portion is likely to occur.

This is confirmed as phenomena such as likeliness of rapid abrasion in an end part of a tread, for example, in the case of inclining the body significantly.

Patent Document 1: JP 2001-206009 A
Patent Document 2: JP 2002-316512 A

DISCLOSURE OF THE INVENTION

In general, in order to ensure the rapid durability and the rapid stable performance of a tire, a spiral reinforcing layer in which a cord extends in the circumferential direction of the tire is provided and a technique of preventing an increase of diameter due to centrifugal force during rapid traveling is adopted so that such a spiral reinforcing layer is buried in the position close to the radially outer side of the tire or the tread surface in a lot of cases.

However, such a spiral reinforcing layer suppresses extension in the circumferential direction of the tire strongly. Consequently, relative displacement between the spiral reinforcing layer and the tread surface occurs in the tread rubber to enlarge shear deformation in the circumferential direction.

In the case where the cannber angle is 0 degrees, that is, a tire is traveling straight, shear deformation of this tread rubber in the circumferential direction of the tire occurs to the traction direction in the center part of the ground contacting plane and occurs to the braking direction in the both end parts of the ground contacting shape in the width direction. The reason thereof is illustrated in FIG. 7 and is that, since a tire 100 for a motorcycle is provided with a round crown shape, the perimeter of a belt 102 made of a spiral reinforcing layer of the center part of the tire 100 for motorcycle (D in FIG. 7) in the ground contacting plane 101 of the tire, that is, radius to the site where a belt 102 is arranged is different from that of the both end parts in the width direction (C in FIG. 7).

In the case where the tire rotates at a constant velocity, the velocity of the belt 102 is expressed by multiplying the radius of that portion and the angular velocity of the tire. However, since the belt radius is larger in the center part, the velocity of the center part is relatively faster.

However, since the tread surface is in contact to the road surface and any site travels at the same velocity during contact to the ground. As illustrated in FIG. 7, in the case of the cannber angle being 0 degrees, the velocity of the belt 102 of the tire center part D is faster than that of the tread surface 104. Therefore, the tread rubber 106 of the tire center part D accepts shear deformation to the traction direction and, on the other hand, the both end parts C of the ground contacting shape of the belt 102 in the width direction are slower and, therefore, the tread rubber 106 of the both end parts C in the width direction accepts shear deformation to the braking direction.

In this state, in the case where driving force is applied to the tire 100, the tire center part D already receiving shear deformation to the traction direction is likely to slip so that the tire center part D will start slipping in the case where large driving force is applied.

Next, in the case where the cannber is given so that the cannber angle is, for example, 45 degrees, that is, the case where a motorcycle is cornering will be described.

The sectional shape and the ground contacting shape of the tire are illustrated in FIG. 6.

In the case where the tire 100 contacts the ground at a cannber angle, shear deformation distribution in the circumferential direction in the ground contacting plane described above will become bilaterally asymmetrical. That is, the belt radius and the belt velocity of the tire 100 in A in FIG. 6 near the center of the tread part is respectively larger and faster than those in the position B of the end part of the tread.

The traveling velocity of the tire (the tread surface contacts the road surface and moves together with the road surface and, therefore, this is considered to be velocity of the tread surface) is in the middle of the velocity of the belt 102 in the position A and the velocity of the belt 102 in the position B. Therefore, the position A enters the traction state where the belt is faster than the tread surface. The position B enters the braking state where the belt is slower than the tread surface. Such a phenomenon is likely to occur as difference between the belt radius in the A position and that in the B position gets larger.

That is, the tire of the motorcycle gets rounder as the crown shape of the tire 100 comes nearer the end part so as to be likely to provide difference in the belt radius. Difference of shear deformation in the circumferential direction of the tread rubber 106 in the ground contacting plane is likely to get larger as the body is inclined more.

In addition, in the case where driving force is multiplied further in the ground contacting state at a cannber angle being 45 degrees, for example, shear deformation of the site of A to the traction direction in FIG. 6 is severer further since shear deformation to the traction direction has already occurred in the case where driving force is not multiplied and, therefore, the tread rubber 106 of the site of A reaches the slip limit first to start slipping.

When A starts slipping, the tread rubber 106 in the site of B is originally provided with shear to the braking direction. Therefore, even when the driving force is applied, the shear state is not so large as that of the tread rubber 106 of A. Thus, even when A reaches the slip limit, the site of B does not reach the slip limit.

That is, a non-uniform state of slipping occurs in the ground contacting plane.

In general, abrasion of rubber occurs due to slip between the road surface and the tread rubber. Therefore, in the state as described above, only the site of A will gets abraded.

As described above, in the case of the tire provided with a spiral reinforcing layer, the reinforcing layer does not extend in the circumferential direction. Therefore, the velocity difference component of the belt due to tire radius will become apparently significantly influential.

In contrast, in the case of an intersecting belt layer lacking in the spiral reinforcing layer, the intersecting belt is deformed like pantograph so that the belt gets extendable or shrinkable in the circumferential direction so that the velocity difference component of the above described belt can be alleviated.

However, in the case of the spiral reinforcing layer, the velocity difference component directly appears to be slip difference on the tread surface.

The present invention is attained to solve the above described problems and an object is to provide a pneumatic tire for a motorcycle in which partial abrasion can be suppressed by making the slip component of a tread rubber in the circumferential direction of tire as uniform as possible in the ground contacting plane.

In order to attain the above described objects, an aspect of the invention related to claim 1 is characterized by including a bead core buried in a left-right pair of bead part; a carcass made of not less than one sheet of carcass ply straddling in the troid state from one bead part to the other bead part with end portions being wound around the above described bead core or being sandwiched between bead cores or being arranged with the bead core and latched by the bead core; at least one sheet of spiral belt layer arranged outside this carcass in the tire radial direction with a band form including one or a plurality of cords arranged in parallel buried in coating rubber being wound spirally and formed; tread rubber arranged further outside the spiral belt layer in the tire radial direction to form a tread part contacting the road surface; not less than one auxiliary belt layer arranged between the spiral belt layer and the tread rubber with a plurality of cords being inclined at 45 to 90 degrees to the circumferential direction of the tire being buried in the coating rubber; and a cushion rubber layer arranged between the spiral belt layer and the auxiliary belt layer.

In the present invention, the cord used in the spiral belt layer can be a steel cord and can be an organic fiber cord made of aromatic polyamide, for example.

Next, an operation of the pneumatic tire for a motorcycle according to claim 1 will be described.

In the case where the spiral belt layer is positioned near the tread surface, shear deformation in the circumferential direction of the tread rubber is encouraged to become a cause of deteriorating partial abrasion as described above. That is, in the case where the belt layer being present inside the tread rubber is a spiral belt layer, the cord in the spiral belt layer does not extend in the circumferential direction and, therefore, shear deformation in the circumferential direction of the tread rubber is different in places, giving rise to a problem of non-uniformity.

However, the cushion rubber layer of the pneumatic tire for a motorcycle according to claim 1 can undergo shear deformation in the circumferential direction during traveling since the cushion rubber layer is arranged on the spiral belt layer.

And the auxiliary belt layer including a cord inclining at 45 to 90 degrees to the circumferential direction of the tire is arranged on the cushion rubber layer and, thereby, shear deformation of the cushion rubber layer can be transmitted to the tread rubber thereon after being smoothed by the auxiliary belt layer.

That is, as compared with a case not provided with the cushion rubber layer and the auxiliary belt layer, presence of the cushion rubber layer can reduce shear deformation of the tread rubber itself and can suppress partial abrasion since the cushion rubber layer instead of the tread rubber undergoes shear deformation (a portion of deformation of the tread rubber is taken over by the cushion rubber layer).

Here, the reason why the angle of the cord in the auxiliary belt layer is set to a range of 45 to 90 degrees to the circumferential direction of the tire is as follows.

Firstly, when the angle of the cord in the auxiliary belt layer is less than 45 degrees, the auxiliary belt layer is provided with tendency to be hardly expandable in the circumferential direction. Ultimately, with 0 degrees, this is not different from the spiral belt layer, in spite that the auxiliary belt layer is added, and the auxiliary belt layer does not extend in the circumferential direction as in the case of the spiral belt layer but the velocity difference of the belts will be directly transmitted to the tread surface. Therefore, at an angle with less than 45 degrees, extension hardly takes place the circumferential direction, which is not preferable.

On the other hand, in the case of 45 degrees or more, coating rubber between the cords of the member extends in the circumferential direction and thereby can extend as a member. In particular, in the case of 90 degrees, the cords are aligned in the width direction so that the rubber between the cords extends in the circumferential direction and therefore is preferably very likely to extend.

In addition, the reason why not only the cushion rubber layer but also the auxiliary belt layer is necessary is as follows.

With only the cushion rubber layer, two rubber layers (the tread rubber and the cushion rubber layer) will be in the state of being stacked in the tire radial direction. In the case where this cushion rubber layer undergoes shear deformation, the tread rubber and the cushion rubber layer will undergo deformation with a bend for the lateral force in the tread width direction due to thickness of the rubber layers.

In contrast, the auxiliary belt layer with an angle of the cord being set to a range of 45 to 90 degrees to the circumferential direction of the tire is added between the tread rubber and the cushion rubber layer and then the spiral belt layer on the inner side of the cushion rubber layer and the auxiliary belt layer between the cushion rubber layer and the tread rubber establish parallel relation and, therefore, try to maintain that parallel relation even if deformation occurs. That is, as compared with the case only with the cushion rubber layer and the tread rubber, in the case of causing shear deformation, bend deformation of rubber hardly occurs under the operation of the auxiliary belt layer to give rise to a state which is stronger against shear deformation.

In particular, taking, as an example, the case where the auxiliary belt layer is added to the tire equatorial plane at 90 degrees, the tread rubber gets stronger against force in the width direction than against force in the tire equatorial plane direction (the circumferential direction). That is, in such a case, shear deformation of traction and braking in the circumferential direction is likely to be absorbed so that the cushion rubber layer hardly undergoes shear deformation against cornering force from the lateral direction (cannber thrust).

From such a point of view, unlike the case with only one set of the cushion rubber layer and the auxiliary belt layer, two or more sets of cushion rubber layer and auxiliary belt layer can be present as in the case with spiral belt layer+cushion rubber layer+auxiliary belt layer+another cushion rubber layer+another auxiliary belt layer+tread rubber.

An aspect of the invention related to claim 2 is the pneumatic tire for a motorcycle according to claim 1 characterized in that a main intersecting layer comprising a plurality of belt plies with a plurality of second cords mutually arranged in parallel being buried in coating rubber, with mutually adjacent belt plies having the second cords being inclined for a tire equatorial plane in mutually opposite directions is arranged in the inner side in the tire radial direction of the spiral belt layer.

Next, an operation of the pneumatic tire for a motorcycle according to claim 2 will be described.

The pneumatic tire for a motorcycle can include only the spiral belt layer for the belt portion. But a high-performance tire pursuing stable steering performance with only a spiral belt layer tends to get short in inplane shear stiffness of the belt portion. Therefore, large cannber thrust is hardly obtainable.

Therefore, in the case of pursuing more stable steering performance, two main intersecting layers in which cords mutually intersect with each other is arranged in combination with the spiral belt layer. That main intersecting layer is called a breaker. In general, the main intersecting layer, in which an organic fiber cord made of aromatic polyamide, for example, is struck, is used.

This pneumatic tire for a motorcycle is characterized in that the main intersecting layer is present on the inner side in the tire radial direction of the spiral belt layer. In the case where the main intersecting layer is present on the radially inner side of the spiral belt layer, the spiral belt layer pushes the main intersecting layer from outside so that the main intersecting layer gets hardly delaminated to improve durability.

An aspect of the invention related to claim 3 is the pneumatic tire for a motorcycle according to claim 1 characterized in that a main intersecting layer comprising a plurality of belt plies with a plurality of second cords mutually arranged in parallel being buried in coating rubber, with mutually adjacent belt plies having the second cords being inclined for a tire equatorial plane in mutually opposite directions is arranged between the above described spiral belt layer and cushion rubber layer.

Next, an operation of the pneumatic tire for a motorcycle according to claim 3 will be described.

The pneumatic tire for a motorcycle according to claim 3 includes the main intersecting layer being arranged on the spiral belt layer in an attempt to arrange the spiral belt layer being the most hardly extendable in the circumferential direction in the position as far as from the tread surface. The point of this pneumatic tire is that a member being likely to extend is caused to come near the tread surface.

As described on the operation of the tire according to claim 1, the cord of the auxiliary belt layer being present in the most outer layer is inclined at 45 to 90 degrees to the circumferential direction of the tire. If this angle gets closer to 0 degree with respect to the circumferential direction of the tire, this belt layer starts functioning like a spiral belt layer so that shear deformation in the circumferential direction of the tread rubber will be encouraged. In the case where the angle is given in a range of 45 to 90 degrees to the circumferential direction of the tire, deformation occurring in the cushion rubber layer to become cushion material in its inside can be followed by extension in the circumferential direction. Also due to such a mechanism, the spiral belt layer is more preferable to be present inside the tire and the spiral belt layer is preferably present inside the main intersecting layer.

However, as in the case of the pneumatic tire for a motorcycle according to claim 2, even when the spiral belt layer is arranged outside the main intersecting layer, the cushion rubber layer thereon and, moreover, the auxiliary belt with the cord angle being 45 to 90 degrees to the circumferential direction of the tire sufficiently enable an improvement in performance.

Here, the pneumatic tire for a motorcycle according to claim 3 includes the main intersecting layer being present outside the spiral belt layer and, moreover, the cushion rubber layer and the auxiliary belt are arranged thereon and, therefore, is more preferable against deformation of the tread rubber.

An aspect of the invention related to claim 4 is the pneumatic tire for a motorcycle according to any one of claim 1 to claim 3 characterized in that the cord in the above described auxiliary belt layer is an organic fiber cord.

Next, an operation of the pneumatic tire for a motorcycle according to claim 4 will be described.

If the cord in the auxiliary belt layer is an organic fiber cord, an increase of antiplane bend rigidly in the tread portion of the tire is a little and, therefore, an effect of uniformity of slip characteristics of the present invention is obtainable with flexible ground contacting property being retained (without spoiling the stable steering performance).

An aspect of the invention related to claim 5 is the pneumatic tire for a motorcycle according to any one of claim 1 to claim 4 characterized in that thickness of the cushion rubber layer is set to within a range of 0.5 to 4.0 mm.

Next, an operation of the pneumatic tire for a motorcycle according to claim 5 will be described.

Thickness of the cushion rubber layer will absorb belt velocity difference in the spiral belt layer (velocity difference is referred to, as described above, difference of belt velocity in the circumferential direction=rotary direction of the tire in the position in the direction of width of the tire).

With thickness of the cushion rubber layer being less than 0.5 mm, the cushion rubber layer cannot be deformed sufficiently to become unable to absorb velocity difference. On the other hand, with thickness of the cushion rubber layer exceeding 4.0 mm, the cushion rubber layer can be deformed sufficiently to enable absorption of velocity difference. However, the cushion rubber layer is too much deformed so that the cushion rubber layer acts extremely softly to spoil stable performance of the tire when lateral force is applied to the tire.

That is, if the cushion rubber layer is too thick, bend deformation occurs in the rubber to act substantially as the tire with too thick tread rubber giving rise to tire property lacking in a sense of stiffness, which is not preferable.

Here, thickness of the cushion rubber layer is preferably 0.7 to 3.5 mm and more preferably 1.0 to 3.0 mm.

An aspect of the invention related to claim 6 is the pneumatic tire for a motorcycle according to any one of claim 1 to claim 4, characterized by fulfilling Ds>Dc, Ds being average thickness from the spiral belt layer to the auxiliary belt layer in a shoulder side region being the closest to the tread end among trisected regions when the tread surface from the tire equatorial plane to the tread end is trisected; and Dc being average thickness from the spiral belt layer to the auxiliary belt layer in the center side region on the tire equatorial plane side among the trisected regions.

Next, an operation of the pneumatic tire for a motorcycle according to claim 6 will be described.

This pneumatic tire for a motorcycle is provided with thicker average thickness from the spiral belt layer to the auxiliary belt layer in the shoulder side region than in the center side region of the tread. The reason hereof is that anteroposterior shear deformation of the tread rubber (driving near the center and braking near the shoulder) appears strongly in the shoulder side region of the tire so that average thickness for this portion from the spiral belt layer to the auxiliary belt layer is increased to alleviate the anteroposterior motion of tread. In the center side region of the tread, average thickness from the spiral belt layer to the auxiliary belt layer is made thin to suppress weight increase of the tire to the minimum.

In particular, in the case of a motorcycle, since the vehicle body is light, weight of tire significantly affects feeling of a rider on stable steering performance and lightness of a tire will be important since a human being and the vehicle body become one body to allow comfortable bike steering.

In claim 6, the tread surface from the tire equatorial plane to the tread end was equally divided into three portions. Thus, the reason of trisection is that the portion which contacts ground when the body is inclined significantly to make cannber angle at 45 or higher degrees is in the range of L/3 from the tread end, L being distance along the tread surface from the tread end to the tire equatorial plane. An average tire for motorcycle contacts a road surface only in the portion of approximately ⅙ of the entire tread width for cornering with the body being significantly inclined. That is, the shoulder side region represents the region contacting the ground in the tread when the tire is inclined like that. In addition, the center side region is a region in contact to a road surface when the tire is traveling straight.

Here, as for the region between the shoulder side region and the center side region, thickness of the cushion rubber layer is not defined but is a changing zone since thickness varies from the center side region to the shoulder side region. Rapid change of thickness of the cushion rubber layer is not preferable since a step is generated on the tread surface. Thickness is preferably changed gradually and this change is preferably caused to occur in the region from the center side region to the shoulder side region.

Here, thickness from the spiral belt layer to the auxiliary belt layer means a distance from the center of the cord configuring the spiral belt layer to the center of the cord configuring the auxiliary belt layer. In the case where two spiral belt layers are present, it will mean the distance from the center of the cord in the outermost spiral belt layer in the radial direction. In addition, in the case where two auxiliary belt layers are present, it will mean the distance to the center of the cord in the innermost auxiliary belt layer in the radial direction.

Here, another belt layer being not the spiral belt layer (the cord is inclined at an angle being 40 or higher degrees to the tire equatorial plane) can be present outside in the radial direction of the spiral belt layer. Also for this case, there is no change in definition on thickness from the spiral belt layer to the auxiliary belt layer.

The reason hereof is that the belt layer including a cord being inclined at 40 or higher degrees to the tire equatorial plane besides the spiral belt layer can extend in the circumferential direction and, therefore, shear deformation can take place in the circumferential direction as in the case of the tread rubber even if this is positioned outside the spiral belt layer.

The reason why the average thickness is adopted from the spiral belt layer to the auxiliary belt layer in the center side region and the shoulder side region is that there is dispersion in thickness at the occasion of manufacturing a tire and, therefore, the actual condition making determination on thickness strictly in which position to be adopted difficult and the present invention substantially alleviate anteroposterior shear deformation distribution of the tread rubber at the time of cornering with the cannber angle at 45 or higher degrees to increase the lateral force to suppress anteroposterior slip to improve abrasion resistant property and, therefore, thickness had better to be defined on the tread region in its entirety contacting the ground at the cannber angle being 45 or higher degrees.

That is, average thickness in the tread site contacting the ground at the cannber angle being 45 degrees is preferably thick and should be average thickness in that region.

An aspect of the invention related to claim 7 is the pneumatic tire for a motorcycle according to claim 6, characterized in that thickness of the cushion rubber layer in the shoulder side region is set to within a range of 0.5 to 4.0 mm.

Next, an operation of the pneumatic tire for a motorcycle according to claim 7 will be described.

Thickness of the cushion rubber layer will absorb belt velocity difference in the spiral belt layer (velocity difference is referred to, as described above, difference of belt velocity in the circumferential direction of the tire=rotary direction of the tire in the position in the direction of width of the tire). With thickness of the cushion rubber layer in the shoulder side region being less than 0.5 mm, the cushion rubber layer cannot be deformed sufficiently to be unable to absorb velocity difference. On the other hand, with thickness of the cushion rubber layer in the shoulder side region exceeding 4.0 mm, the cushion rubber layer can be deformed sufficiently to enable absorption of velocity difference. However, the cushion rubber layer is too much deformed so that the cushion rubber layer acts extremely softly to spoil stable property of the tire when lateral force is applied to the tire. That is, if the cushion rubber layer is too thick, deformation occurs in the cushion rubber layer to act substantially as the tire with too thick tread rubber giving rise to tire property lacking in a sense of stiffness, which is not preferable.

In addition, in claim 7, thickness of the cushion rubber layer in the shoulder side region is specified and that in the center side region is not specified. The reason hereof is that anteroposterior (the circumferential direction) shear deformation is extremely significant on the shoulder side of the tread and it becomes very important to alleviate shear deformation in the circumferential direction on the shoulder side.

Here, as for thickness of the cushion rubber layer in the center side region, thickness of the cushion rubber layer in the center side region is less than 4 mm since thickness of the cushion rubber layer in the center side region is thinner than thickness of the cushion rubber layer in the shoulder side region. In the case where the tread in the center side region is too thick, tire weight becomes unreasonably heavy to spoil steering stability.

An aspect of the invention related to claim 8 is the pneumatic tire for a motorcycle according to claim 6 or claim 7, characterized in that thickness of the above described cushion rubber layer in the above described center side region is set to less than 0.5 mm.

Next, an operation of the pneumatic tire for a motorcycle according to claim 8 will be described.

Since shear deformation in the circumferential direction hardly occurs in the center side region compared with the shoulder side region, the cushion rubber layer can be made thin. Accordingly, thickness of the cushion rubber layer in the center side region can be made less than 0.5 mm and, thereby, tire weight can be made light.

An aspect of the invention related to claim 9 is the pneumatic tire for a motorcycle according to any one of claim 1 to claim 8, characterized in that elastic modulus of the above described cushion rubber layer is smaller than elastic modulus of the above described tread rubber.

Next, an operation of the pneumatic tire for a motorcycle according to claim 9 will be described.

It is more convenient that the cushion rubber layer is softer since the cushion rubber layer functions to absorb velocity difference in the belt as described above. In particular, since two kinds of rubber on the belt, that is, the tread rubber and the cushion rubber layer are used, relative elastic modulus for the both parties becomes important in the case of considering shear deformation of the rubber part.

That is, if the cushion rubber layer is softer than the tread rubber, the cushion rubber layer in its inside can absorb the velocity difference component of the belt greatly.

On the contrary, if the cushion rubber layer is harder than the tread rubber, the cushion rubber layer cannot fully absorb the velocity difference component and therefore, the velocity difference component is likely to be transmitted to the tread rubber as well.

An aspect of the invention related to claim 9 is the pneumatic tire for a motorcycle according to any one of claim 1 to claim 8, characterized in that the auxiliary belt layer is arranged only on the both sides of the tread so as not to be arranged on the tread center side and the auxiliary belt layer is arranged within a range of 0.2 to 0.6L at least from the tread end to the tire equatorial plane side and is not arranged 0.6L closer to the tire equatorial plane side from the tread end to the tire equatorial plane side, L being the tread half width from the tire equatorial plane to the tread end obtained by measuring the tread part along the tread surface.

Next, an operation of the pneumatic tire for a motorcycle according to claim 9 will be described.

In particular, the velocity difference component of tire is likely to occur when a cannber angle is given as described above and, therefore, only this case can be made effective. Since there is a concern that the tread part becomes too much harder than the antiplane bend stiffness in the case of arranging the auxiliary belt layer across the entire tread region, flexible deformation of tire is maintained by arranging the auxiliary belt layer only on the both end sides of the tread but not arranging it in the tire center part. Thereby, both comfortable ride performance and the effect of the present invention can be established at the same time.

In particular, the ground contacting state when the body is inclined significantly at the cannber angle being 40 or higher degrees, for example, is observed to note that the entire region of the ground contacting plane when the body is inclined significantly can be substantially covered so that the other portions not contacting the ground can be made soft if the auxiliary belt layer is arranged within the above described range. Here, if the auxiliary belt layer is arranged closer to the tire equatorial plane side beyond the above described range, it will become impossible to soften the tread center side and to improve comfortable ride performance.

As described above, according to the pneumatic tire for a motorcycle of the present invention, the slip component of tread rubber in the circumferential direction of tire can be made as uniform as possible in the ground contacting plane to suppress partial abrasion, giving rise to an excellent effect.

Figure 1:
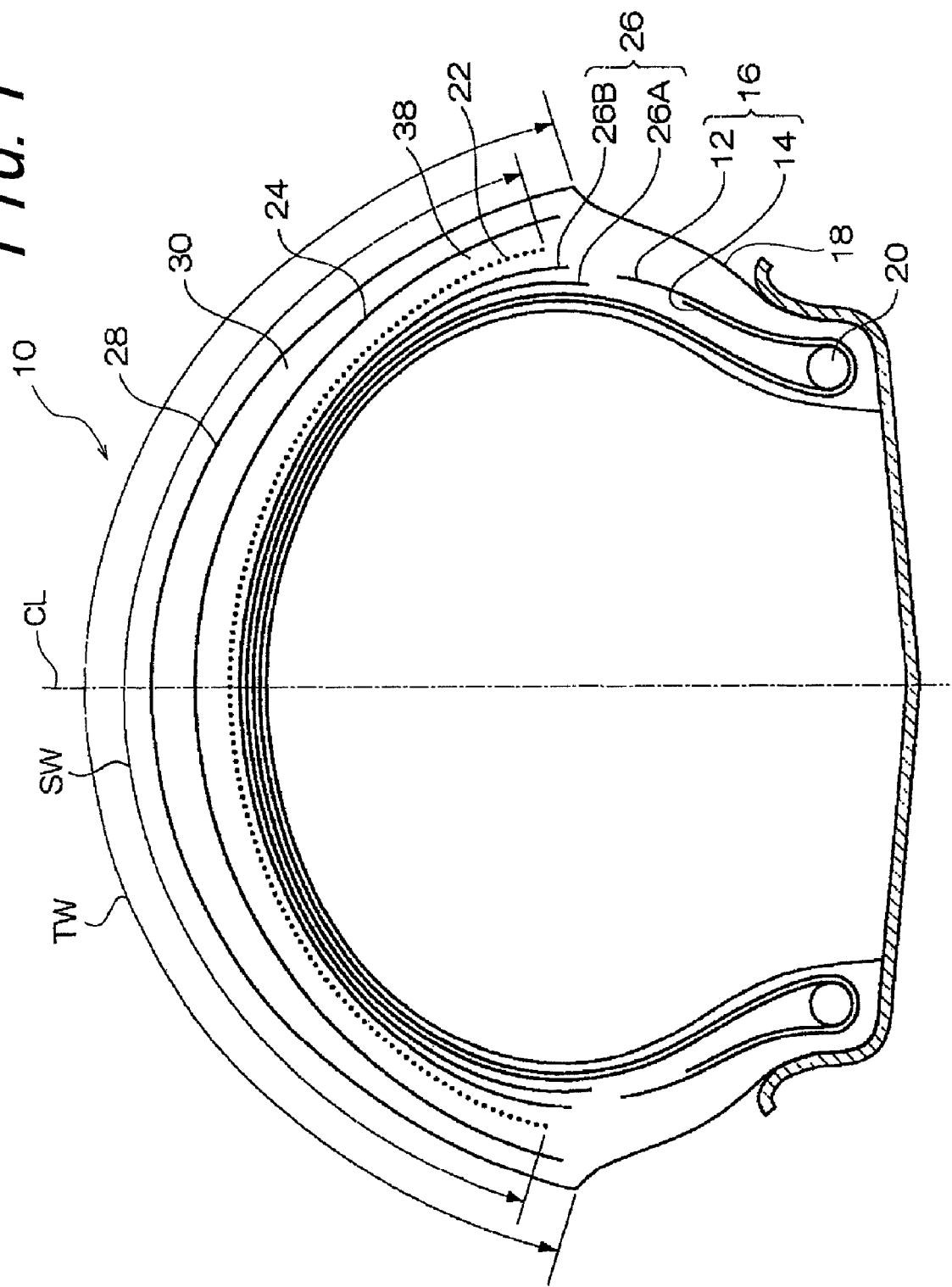
FIG. 1 is a sectional diagram taken along the rotary axis of a pneumatic tire for a motorcycle according to a first embodiment.

DESCRIPTION OF SYMBOLS 10 pneumatic tire for motorcycle
16 carcass
18 bead part
20 bead core
22 spiral belt layer
24 inclination belt layer (auxiliary belt layer)
26 main intersecting layer
28 tread
30 tread rubber
38 cushion rubber layer

BEST MODE FOR CARRYING OUT THE INVENTION

First Embodiment

A first embodiment of a pneumatic tire for a motorcycle of the present invention will be described with reference to FIG. 1.

As illustrated in FIG. 1, a pneumatic tire 10 for a motorcycle of the present embodiment comprises a carcass 16 configured by a first carcass ply 12 and a second carcass ply 14 including cords extending in the intersecting direction with respect to a tire equatorial plane CL being buried.

(Carcass)

Both end portions of the first carcass ply 12 and the second carcass ply 14 are respectively wound up from the inner side to the outer side of the tire around a bead core 20 buried in a bead part 18.

The first carcass ply 12 includes a plurality of cords (such as organic fiber cords made of nylon, for example) extending in the radial direction being buried with arrayed in parallel in coating rubber. For the present embodiment, the angles of the cords in the tire equatorial plane to the tire equatorial plane are set to 80 degrees. The second carcass ply 14 also includes a plurality of cords (such as organic fiber cords made of nylon, for example) extending in the radial direction being buried with arrayed in parallel in coating rubber. For the present embodiment, the angles of the cords in the tire equatorial plane to the tire equatorial plane are set to 80 degrees. Here, the cord of the first carcass ply 12 and the cord of the second carcass ply 14 mutually intersect and incline in the mutually opposite directions to the tire equatorial plane CL.

Here, although not illustrated in the drawing, the end portions of the carcass ply can be sandwiched by a pair or a plurality of pairs of bead cores for engagement and can be caused to come close or in contact to the inner side surface or the outer side surface of the bead core in the tire width direction for engagement.

(Main Intersecting Layer)

A main intersecting layer 26 is arranged in the outer side in the tire radial direction of this carcass 16.

The main intersecting layer 26 is configured by a first belt ply 26A and a second belt ply 26B.

The first belt ply 26A includes a plurality of cords (cords with diameter of 0.7 mm made by twisting aromatic polyamide fiber, in the present embodiment) being buried with arrayed in parallel in the coating rubber. For the present embodiment, the angles of the cords in the tire equatorial plane to the tire equatorial plane are set to 60 degrees. The second belt ply 26B also includes a plurality of cords (cords of diameter of 0.7 mm made by twisting aromatic polyamide fiber, in the present embodiment) being buried with arrayed in parallel in the coating rubber. For the present embodiment, the angles of the cords in the tire equatorial plane to the tire equatorial plane are set to 60 degrees.

Here, the cord of the first belt ply 26A and the cord of the second belt ply 26B mutually intersect and incline in the mutually opposite directions to the tire equatorial plane CL. In addition, the cord thread density in the first belt ply 26A and the second belt ply 26B in the present embodiment is respectively 25 cords/50 mm.

Here, for the present embodiment, the main intersecting layer 26 is provided on the outer side of the carcass 16 in the tire radial direction but the main intersecting layer 26 can occasionally be omitted.

(Spiral Belt Layer)

At least one spiral belt layer 22 is provided outside this main intersecting layer 26 in the tire radial direction. This spiral belt layer 22 is formed by spirally winding, for example, a longitudinally shaped rubber coated cord made of one cord being coated with unvulcanized coating rubber or a belt-like ply made of a plurality of cords being coated with unvulcanized coating rubber. The cord direction is substantially taken as the circumferential direction of the tire. The cords in the spiral belt layer 22 can be organic fiber cords and can be steel cords.

The spiral belt layer 22 of the present embodiment is formed by spirally winding a band form including two cords (cords with diameter of 0.7 mm made by twisting aromatic polyamide fiber) being buried in parallel in the coating rubber in the rotary axis direction of the tire. Here, the cord thread density in the spiral belt layer 25 in the present embodiment is 50 cords/50 mm.

(Cushion Rubber Layer, Inclination Belt Layer and Tread)

A cushion rubber layer 38, an inclination belt layer 24 as an auxiliary belt layer and a tread rubber 30 forming a tread 28 are arranged in order in the outer side in the tire radial direction of the spiral belt layer 22. The cushion rubber layer 38 is arranged across the entire region between the spiral belt layer 22 and the inclination belt layer 24.

Rubber different from coating rubber of the spiral belt layer 22 and coating rubber of the inclination belt layer 24 is used for the cushion rubber layer 38. As rubber configuring the cushion rubber layer 38, the same rubber as the tread rubber 30 can be used. But rubber with elastic modulus lower than that of the tread rubber 30 is preferably used. For the present embodiment, rubber having elastic modulus of 50% of the tread rubber 30 is used for the cushion rubber layer 38.

The inclination belt layer 24 includes a plurality of cords (cords with diameter of 0.7 mm made by twisting aromatic polyamide fiber in the present embodiment) being buried with arrayed in parallel in the coating rubber. The cord of the inclination belt layer 24 is preferably set to 45 to 90 degrees to the circumferential direction of the tire and is set to 90 degrees for the present embodiment. Here, the cord thread density in the inclination belt layer 24 of the present embodiment is 50 cords/50 mm.

No groove is formed in the tread 28 illustrated in FIG. 1 but a groove for drainage to be considered necessary during traveling on a wet road surface can be formed.

Here, the width TW of the tread 28 being measured along the tire surface is 240 mm and the width SW of the spiral belt layer 22 is 230 mm. In addition, the thickness of the cushion rubber layer 38 is 2.5 mm, the thickness of the tread rubber 30 is 3.8 mm and the thickness of the inclination belt layer 24 is 0.7 mm. Accordingly, total tread thickness from the outer periphery of the spiral belt layer to the tread surface is 7.0 mm.

(Operation)

The radial tire 10 for a motorcycle of the present embodiment is provided with the spiral belt layer 22 on the outer side of the carcass 16 in the radial direction of the tire. Therefore, tension stiffness in the circumferential direction of the tread 28 gets intensive so that protrusion of the tread 28 to the outer side in the radial direction of the tire during rapid traveling can be suppressed to improve rapid durability.

During straight traveling, since the cushion rubber layer 38 with elastic modulus lower than that of the tread rubber 30 is provided, as compared with the case where all is the tread rubber 30, comfortable ride property and vibration absorption property during straight traveling are improved. In addition, since wide ground contacting width can be ensured, straight traveling property can be improved.

On the other hand, when a vehicle corners, since the spiral belt layer 22 and the inclination belt layer 24 retain parallel relation, sufficient side force can be generated to improve cornering stability without generating bend deformation in the tread rubber and the cushion rubber layer for the force in the width direction.

Moreover, in the pneumatic tire 10 for a motorcycle of the present embodiment, the cushion rubber layer 38 having elastic modulus lower than that of the tread rubber 30 is arranged on the spiral belt layer 22 and the inclination belt layer 24 including a cord inclining at an angle of 0 to 45 degrees to the circumferential direction of the tire is arranged on the cushion rubber layer 38. Therefore, shear deformation in the circumferential direction of the cushion rubber layer 38 during traveling can be transmitted to the tread rubber 30 after being smoothed by the inclination belt layer 24.

Accordingly, as compared with a case not provided with the cushion rubber layer 38 and the inclination belt layer 24, shear deformation in the circumferential direction of the tread rubber layer 30 can be reduced relatively because shear deformation occurs in the cushion rubber layer 38 in place of the tread rubber 30, and since the slip component of the tread rubber 30 in the circumferential direction of the tire becomes more uniform in the ground contacting plane, partial abrasion can be suppressed in the present embodiment.

In addition, for the pneumatic tire 10 for a motorcycle of the present embodiment, the main intersecting layer 26 is arranged on the radially inner side of the tire of the spiral belt layer 22 and, therefore, inplane shear stiffness of the belt portion is intensified so that significant cannber thrust is obtainable.

Since the main intersecting layer 26 is arranged on the radially inner side of the tire of the spiral belt layer 22, the main intersecting layer 26 is pushed by the spiral belt layer 22 to be hardly delaminated and thereby durability is improved.

In addition, since the cord of the inclination belt layer 24 is aromatic polyamide cords, antiplane bend stiffness in the tread portion increases only a little. Consequently, an effect of uniformity of slip characteristic is obtained with flexible ground contacting property being retained (without spoiling stable steering performance).

Here, when the angle (to the circumferential direction of the tire) of the cord of the inclination belt layer 24 is less than 45 degrees, the inclination belt layer 24 hardly extends in the circumferential direction so that velocity difference of the belt due to difference in tire radius will be directly transmitted to the tread surface, which is not preferable.

In addition, with thickness o the cushion rubber layer 38 being less than 0.5 mm, the cushion rubber layer 38 cannot be deformed sufficiently to enable no absorption of velocity difference. On the other hand, with thickness of the cushion rubber layer 38 exceeding 4.0 mm, the cushion rubber layer 38 can be deformed sufficiently to enable absorption of velocity difference. However, the cushion rubber layer 38 is too much deformed so that the cushion rubber layer 38 acts extremely softly to spoil stable performance of the tire when lateral force is applied to the tire. That is, the tire property lacking in a sense of stiffness is given rise to, which is not preferable.

Second Embodiment

Next, a second embodiment of radial tire for a motorcycle of the present invention will be described.

Although not illustrated in the drawing, a pneumatic tire 10 for a motorcycle of the present embodiment is different from the first embodiment on the point that a main intersecting layer 26 is arranged between a spiral belt layer 22 and a cushion rubber layer 38 (that is, the positional relation between the spiral belt layer 22 and the main intersecting layer 26 is opposite to that of the first embodiment). Otherwise, the configuration is the same as that of the first embodiment.

By arranging the main intersecting layer 26 on the spiral belt layer 22, the spiral belt layer 22 the most hardly extending in the circumferential direction among belts can be brought apart from the tread surface so that shear deformation of the tread rubber 30 can be alleviated more.

Third Embodiment

Figure 2:
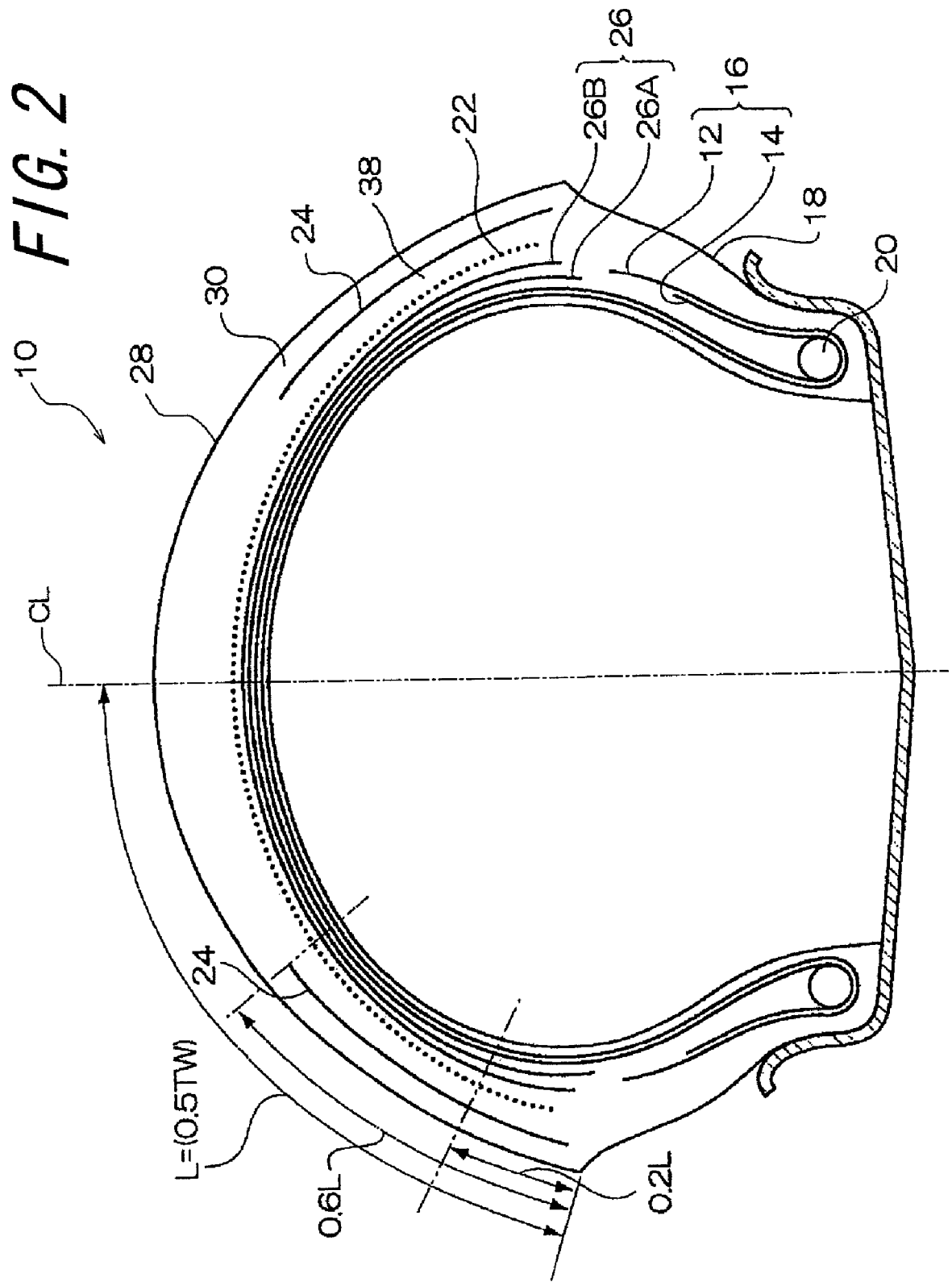
FIG. 2 is a sectional diagram taken along the rotary axis of a pneumatic tire for a motorcycle according to a third embodiment.

Next, a third embodiment of a radial tire for a motorcycle of the present invention will be described with reference to FIG. 2. Here, like reference numerals designate the same components as those of the first embodiment in the drawing to omit description thereon.

A tread 28 becomes occasionally too much harder than antiplane bend stiffness in the case of arranging an inclination belt layer 24 across the entire tread region. However, in a pneumatic tire 10 for a motorcycle of the present embodiment, flexible deformation of tire can be maintained by arranging the inclination belt layer 24 only on the both end sides of the tread but not arranging it in the tire center part. Thus both comfortable ride performance and the effect of the present invention can be established at the same time. Here, a cushion rubber layer 38 is arranged only between the inclination belt layer 24 and a spiral belt layer 22.

Here, with tread half width being L (=0.5 TW), the inclination belt layer 24 is preferably arranged at least within a range of 0.2 to 0.6L from the tread end to the tire equatorial plane CL side and not arranged closer to the tire equatorial plane CL side, that is, not closer to the equatorial plane by 0.6L. When the inclination belt layer 24 is arranged closer to the tire equatorial plane CL side beyond the above described range, the tread center side is no longer allowed to get soft so as to fail in enhancing comfortable ride performance against vertical vibration during straight traveling.

Fourth Embodiment

Next, a fourth embodiment of a radial tire for a motorcycle of the present invention will be described with reference to FIG. 3. Here, like reference numerals designate the same components as those of the first embodiment in the drawing to omit description thereon.

Figure 3:
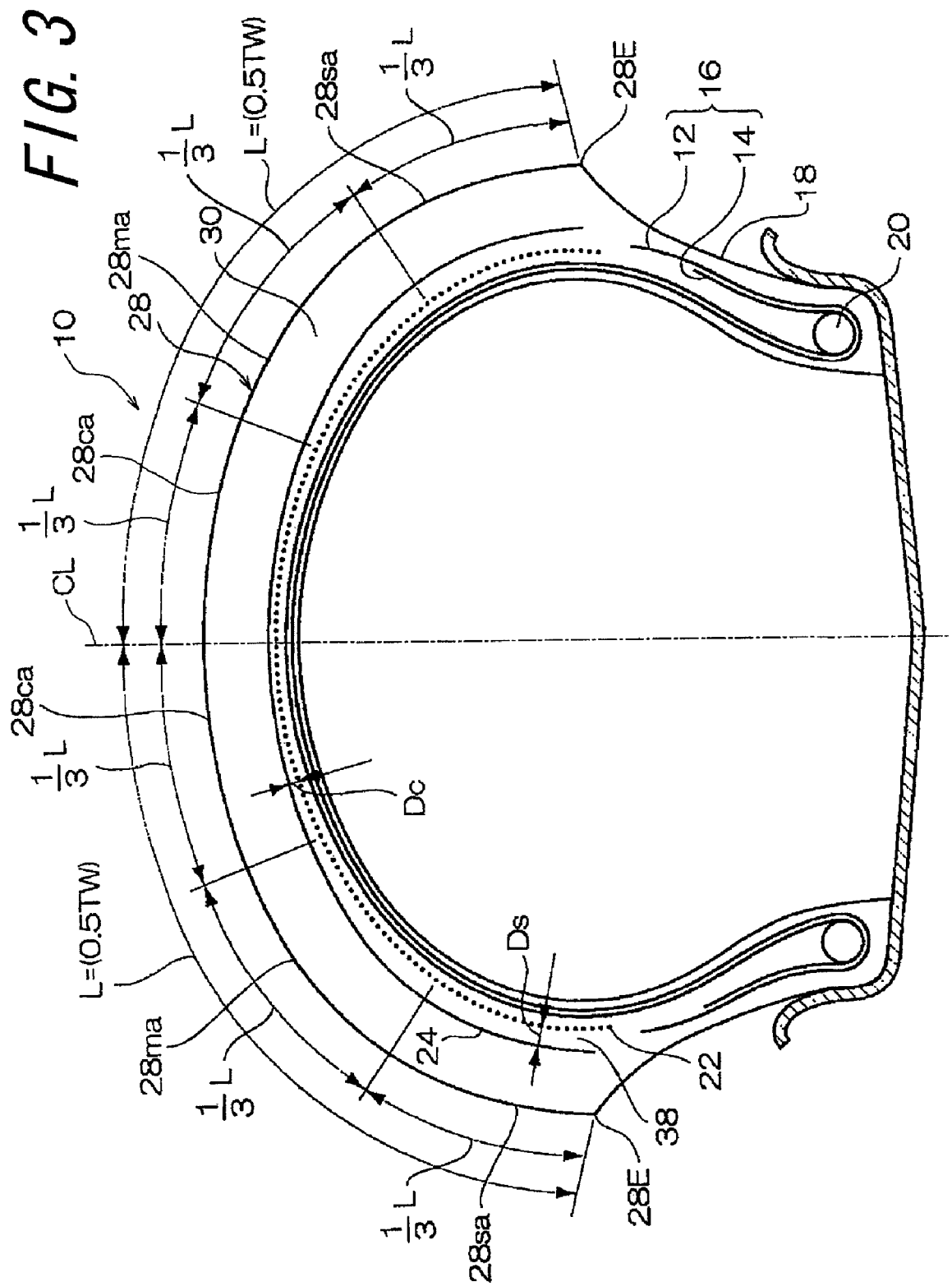
FIG. 3 is a sectional diagram taken along the rotary axis of a pneumatic tire for a motorcycle according to a fourth embodiment.

As illustrated in FIG. 3, in a pneumatic tire 10 for a motorcycle of the present embodiment, a cushion rubber layer 38 and an inclination belt layer 24 are arranged in order in the radially outer side of a spiral belt layer 22. However, thickness of the cushion rubber layer 38 is partially different.

$Ds>Dc$ is fulfilled, Ds being average thickness from the spiral belt layer 22 to the inclination belt layer 24 in a shoulder side region 28sa being close to the tread end 28E among trisected regions when the tread surface from the tire equatorial plane CL to the tread end 28E is equally divided into three portions; and Dc being average thickness from the spiral belt layer 22 to the inclination belt layer 24 in the center side region 28ca on the tire equatorial plane CL side among trisected regions.

Here, average thickness Ds of the cushion rubber layer in the shoulder side region 28sa is preferably set to within a range of 0.5 to 4.0 mm. Thickness Dc of the cushion rubber layer 38 in the center side region 28ca is preferably set to not less than 0.1 mm and less than 0.5 mm.

Here, in the region 28ma between the shoulder side region 28sa and the center side region 28sa, thickness of the cushion rubber layer 38 is preferably changed gradually.

(Operation)

In the pneumatic tire 10 for a motorcycle of the present embodiment, in the shoulder side region 28sa where shear deformation in the circumferential direction becomes larger than in the center side region 28ca, the average thickness from the spiral belt layer 22 to the inclination belt layer 24 as an auxiliary belt layer is larger than that in the center side region 28ca. Therefore, shear deformation of the tread rubber 30 can be alleviated while suppressing the amount of rubber use.

Here, with thickness of the cushion rubber layer 38 in the shoulder side region 28sa being less than 0.5 mm, the cushion rubber layer 38 cannot be deformed sufficiently to become unable to absorb velocity difference. On the other hand, with thickness of the cushion rubber layer 38 in the shoulder side region 28sa exceeding 4.0 mm, the cushion rubber layer 38 can be deformed sufficiently to enable absorption of velocity difference. However, the cushion rubber layer 38 is too much deformed so that the cushion rubber layer 38 acts extremely softly to spoil stable performance of the tire when lateral force is applied to the tire. That is, behavior become similar to that of the tire with too thick tread rubber to give rise to tire property lacking in a sense of stiffness, which is not preferable.

As compared with the shoulder side region 28sa, shear deformation in the circumferential direction hardly occurs in the center side region 28ca. Therefore, thickness of the cushion rubber layer 38 can be less than 0.5 mm. Thereby, the weight of the pneumatic tire 10 for a motorcycle can be reduced.

However, the lower limit value of thickness of the cushion rubber layer 38 in the center side region 28ca is 0.1 mm. A reason thereof is that direct contact between cords is meant in the case of 0 mm and there is a concern that the cords mutually friction at each tire deformation to bring destruction and, therefore, thickness of at least 0.1 mm is required.

Figure 4:
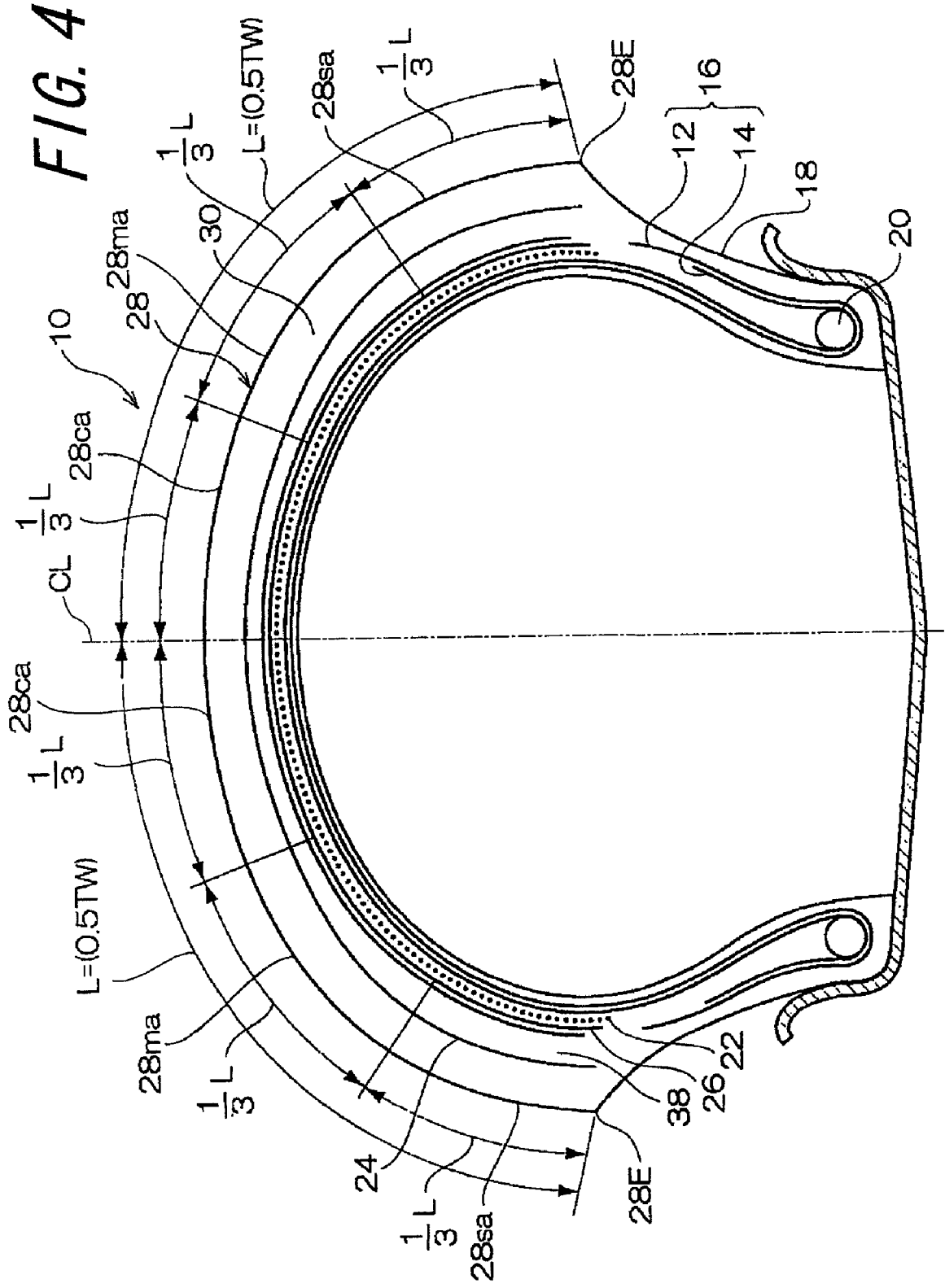
FIG. 4 is a sectional diagram taken along the rotary axis of a pneumatic tire for a motorcycle according to another embodiment (variation of the fourth embodiment)

Here, in the present embodiment, the cushion rubber layer 38 and the inclination belt layer 24 are arranged in order in the outer side in the radial direction of the spiral belt layer 22. However as illustrated in FIG. 4, the main intersecting layer 26 can be arranged between the spiral belt layer 22 and the cushion rubber layer 38.

In addition, the cushion rubber layer 38 can be the same kind of rubber as the rubber coating the inclination belt layer 24. In that case, in the manufacturing process of tire, coating rubber in the inclination belt layer 24 is made thick so that the cord arrangement position in the interior inclination belt layer 24 is biased to enable preparation of the auxiliary belt layer 24 and the cushion rubber layer 38 as one sheet member so that efficiency at manufacturing can be increased.

TEST EXAMPLE 1

In order to confirm performance improving effects of the present invention, one kind of tire of the conventional example and five kinds of tire of embodiments to which the present invention is applied are prepared and steering performance comparing tests are carried out with an actual vehicle. An object of the tests relates to the point whether abrasion due to slip at traction is improved and the point whether the present invention results in any decrease in steering stability. For the tests, only the rear tire is exchanged while the conventional front tire is always fixed.

The tests are carried out by mounting a test tire on the rear wheel of a 1000 cc motorcycle of a sport type to carry out rather aggressive traveling with an actual vehicle (close to the limit) on a testing track. On one tire, traveling of ten rounds on the testing track is carried out (for approximately 25 minutes) to investigate the abrasion amount of the tire after traveling. For the abrasion amount, abrasion depth at the site where maximum abrasion occurred in the tread is measured. Strictly, the tire after finishing traveling is cut to measure thickness of the remaining tread rubber and the level of abrasion is measured based on the thickness that is originally present. This circuit is a clockwise circuit and there are a lot of right corners. Therefore, the position undergoing maximum abrasion is near the shoulder of the tread on the right side of the tires for all the tires. In addition, stable steering performance is assessed simultaneously and comprehensively in the ten-point method based on feeling of a test rider. In addition, assessment comments of the test rider are also appended to show the results. Here, the size of the test tire is 190/R50Z17.

CONVENTIONAL EXAMPLE

Figure 5:
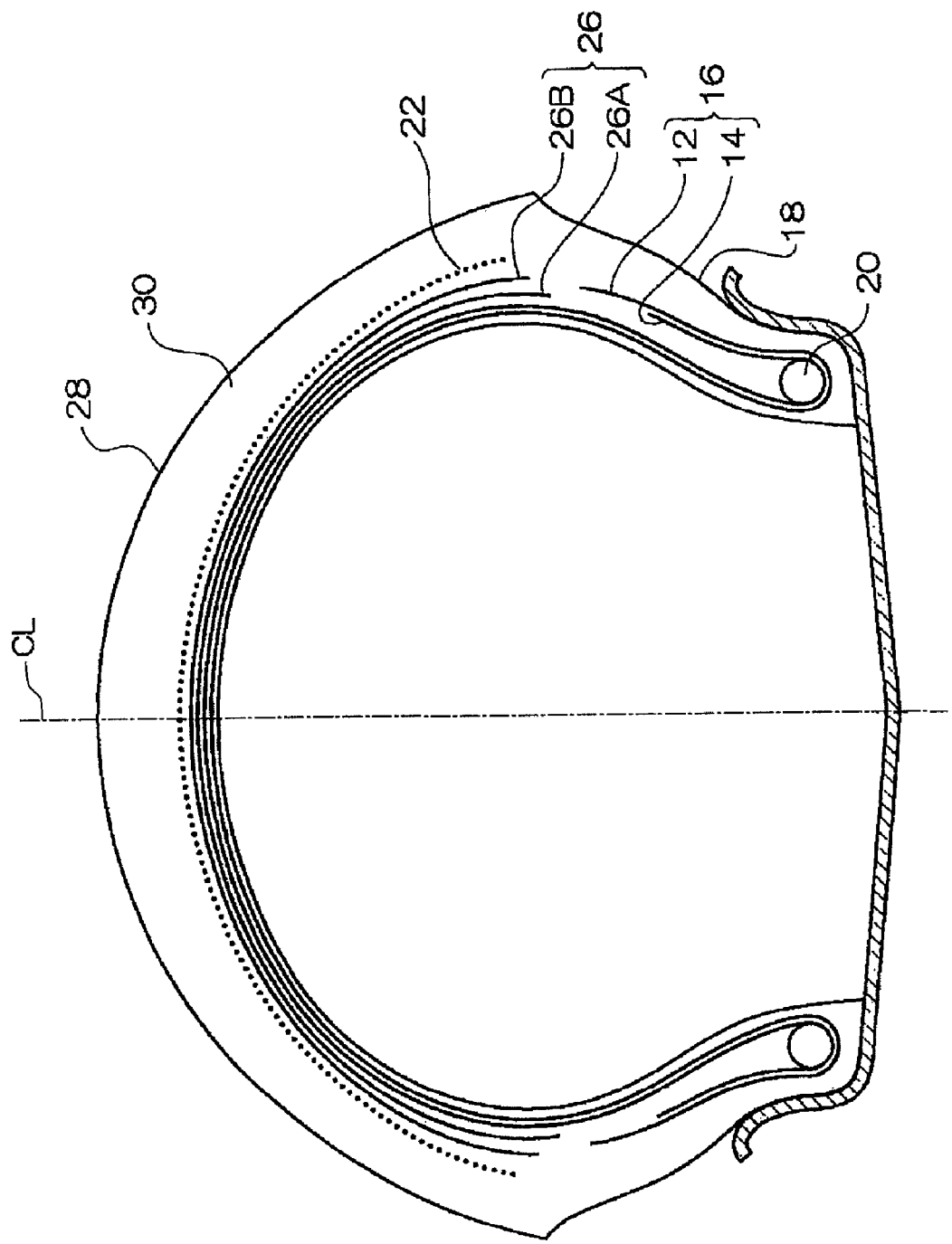
FIG. 5 is a sectional diagram taken along the rotary axis of a pneumatic tire for a motorcycle according to a conventional embodiment.
Figure 6:
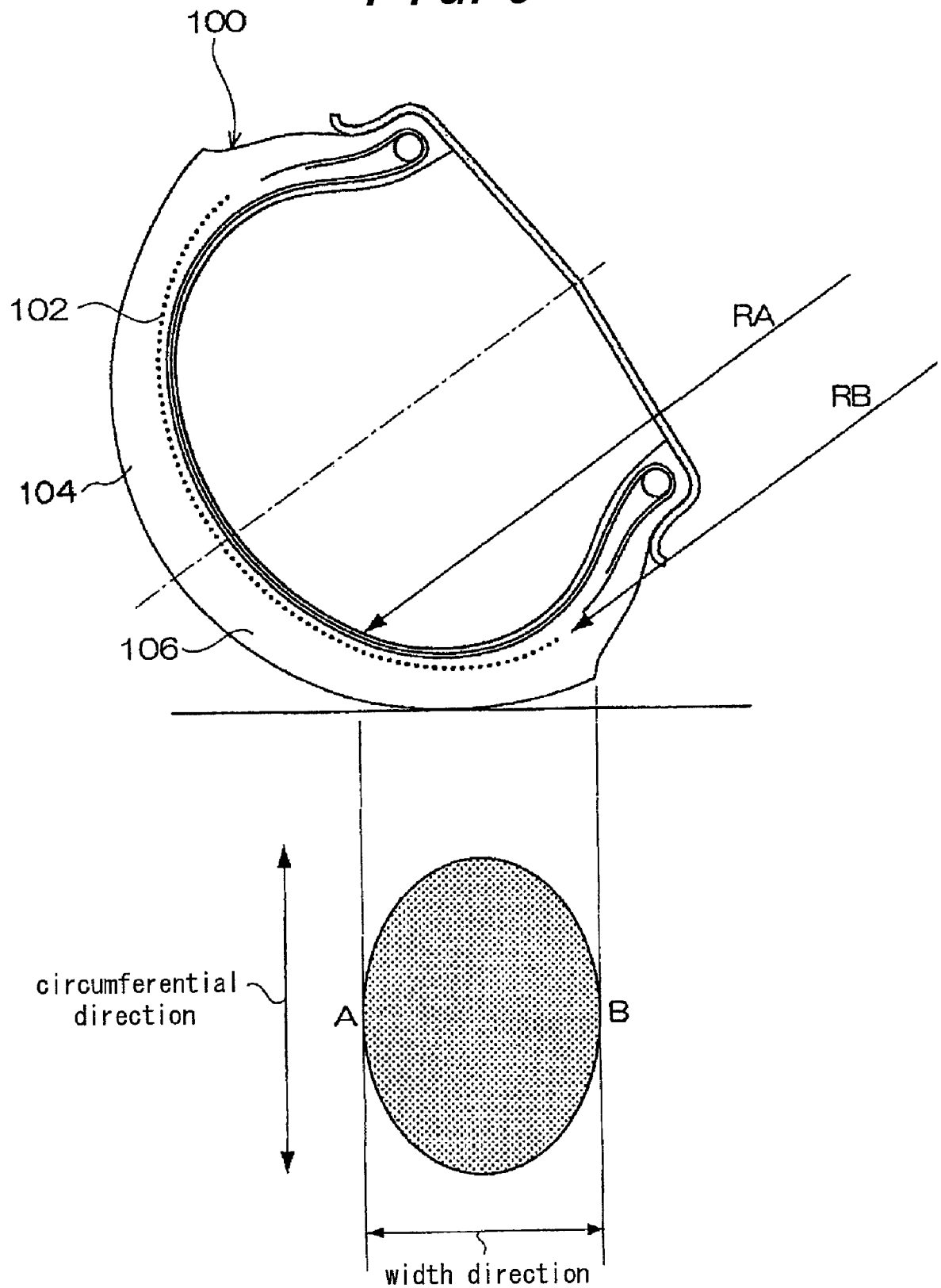
FIG. 6 is a sectional diagram with a ground contacting shape diagram of a pneumatic tire for a motorcycle when the body is inclined.
Figure 7:
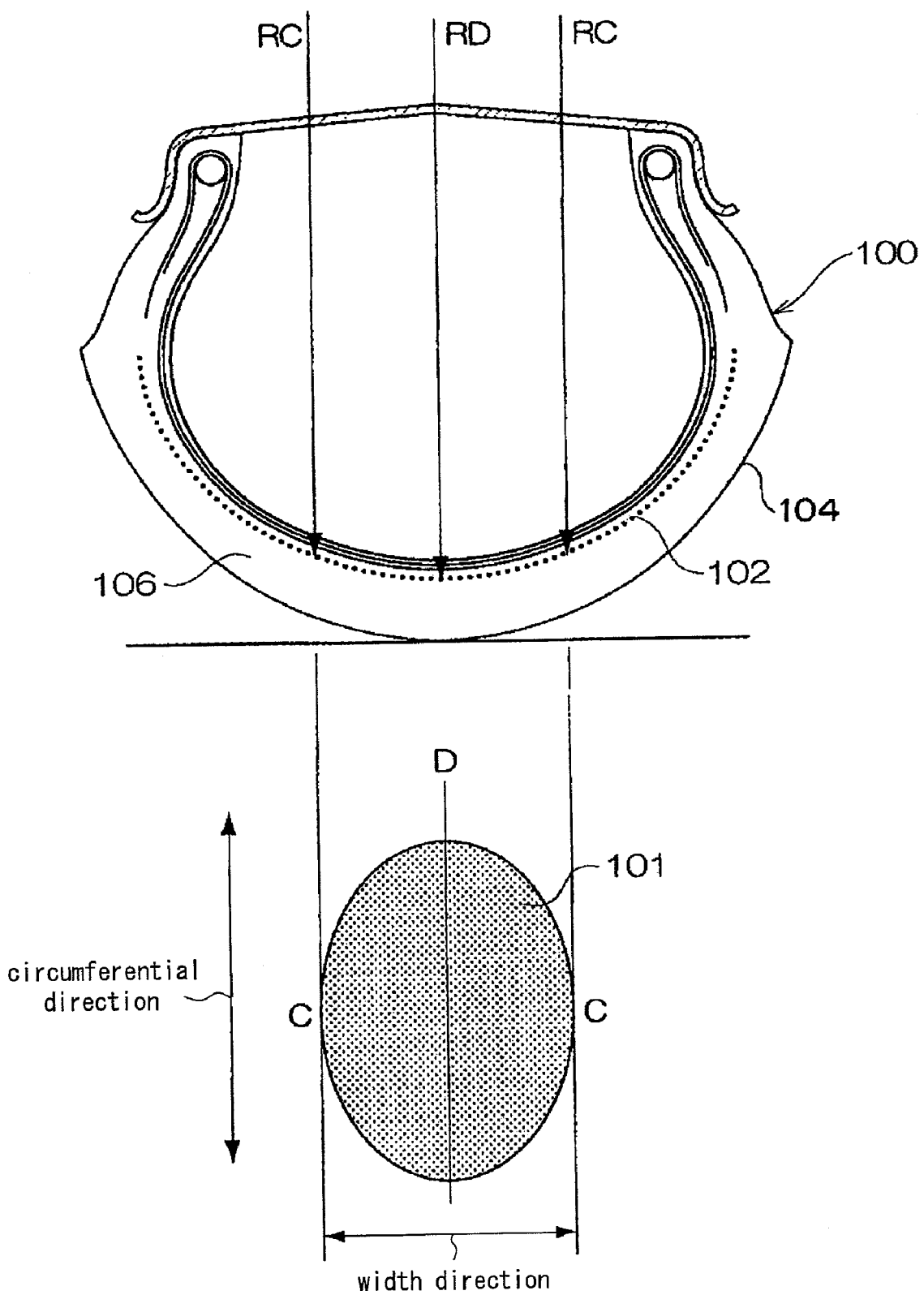
FIG. 7 is a sectional diagram with a ground contacting shape diagram of a pneumatic tire for a motorcycle when the body is not inclined (at a cannber angle being 0 degrees).

Structure: FIG. 5. Tread thickness from the spiral belt layer to the tread surface is 7.0 mm.
Maximum abrasion amount: 2.1 mm
Assessment score on stable steering: 5 points
Comments of rider: Gradual abrasion is probably going on as repeating round. In the ninth round and the tenth round, grip force obviously dropped.

EXAMPLE 1

Structure: FIG. 1. Thickness of cushion rubber layer is 2.5 mm. Thickness of tread rubber is 3.8 mm.
Maximum abrasion amount: 1.2 mm
Assessment score on stable steering: 9 points
Comments of rider: Grip force was highly perceptible from the initial period. Assumingly, the tire slipped little to consequently provide good grip. The tire seemed to grip firmly against lateral force also during cornering. Gradual abrasion is probably going on as repeating round. But the drop percentage was extremely small. During the ten rounds, stable traveling was feasible. In addition, also during straight traveling, traction grip in the vertical direction was good. However, the tire seemed to be a little hard.

EXAMPLE 2

Structure: FIG. 1. Rubber of cushion rubber layer is same as tread rubber.
Maximum abrasion amount: 1.5 mm
Assessment score on stable steering: 8 points
Comments of rider: Likewise the example 1, grip force was obviously highly perceptible from the initial period as compared with the conventional example. Gradual abrasion is probably going on as repeating round. But the drop percentage was extremely small. During the ten rounds, stable traveling was feasible. In addition, also during straight traveling, traction grip in the vertical direction was good. However, the tire seemed to be further harder than the tire of the example 1.

EXAMPLE 3

Structure: Positional relation of the main intersecting layer and the spiral belt layer is opposite to that of the example 1.
Maximum abrasion amount: 1.0 mm
Assessment score on stable steering: 9 points
Comments of rider: Approximately the same assessment likewise the example 1. Grip being better than that in the example 1 seemed to be provided when driving force is applied to the tire.

EXAMPLE 4

Structure: FIG. 2. The inclination belt layer had width of 5.0 mm and was arranged immediately below the tread end. In addition, the cushion rubber layer (with 50 mm width) was arranged only on the inner side in the radial direction of the inclination belt layer. The elastic modulus of the cushion rubber layer is the same as embodiments, that is, 50% of tread rubber. The angle of cords in the inclination belt layer was 90 degrees.
Maximum abrasion amount: 1.2 mm
Assessment score on stable steering: 9 points
Comments of rider: Likewise the example 1, extremely good stable steering performance was obtained in contrast with the conventional example. Comments on stable steering performance are likewise those on the example 1. However, as compared with the example 1, hardness of the tire was not perceptible much but smooth ride was attained. With the hard tire, jumping occasionally took place on the road surface and some sites become hardly controllable. However, in the example 4, the tire provided flexible grip at all corners. However, as for traction during straight traveling, grip achievement as that in the example 1 was not perceptible. Taking the point that the tire was not hard but provided good ride and the point that traction during straight traveling was not different from the conventional example into consideration, the assessment score is 9 points likewise that for the example 1.

EXAMPLE 5

Structure: Likewise the example 4 except that the angle of cords in the inclination belt layer was 60 degrees.
Maximum abrasion amount: 1.6 mm
Assessment score on stable steering: 8 points
Comments of rider: approximately the same feeling as that in the example 1 was attained. However, the tire was a little likely to slip when the throttle was opened from the state where the body is inclined.

(Validation on Results)

Abrasion amounts of all tires of the present invention of the examples 1 to 5 were less than that of the tire of the conventional example. That is, reduction in slip (slip in the circumferential direction) was confirmed.

The particularly small abrasion amount was attained with the example 3. It is examined that distance from the spiral belt layer to the tread surface is the longest to provide structure enabling the most uniform slip in the circumferential direction.

Comparing the example 1 with the example 2, the softer cushion rubber layer provides the less abrasion amount. A result hereof is examined that smaller elastic modulus of the cushion rubber layer enables more absorption of velocity difference component in the circumferential direction of the belt and can make slip distribution uniform. In addition, hardness of the tires appears a little in the example 1 and the example 2. The reason hereof is deemed that the cushion rubber layer and the inclination belt layer as the auxiliary belt layer are arranged across the entire width of the tread and, therefore, antiplane bend stiffness in the tread portion is increased.

Comparing the example 1 with the example 4, if the inclination belt layer is arranged only on the shoulder side, slip on the shoulder can be apparently suppressed without increasing antiplane bend stiffness in the tread portion. However, in contrast with the conventional example, the tire of the example 4 in which no cushion rubber layer and no inclination belt layer are present in the center portion does not provide improved traction during straight traveling, that is, traction with the ground contacting center portion. In other words, the structure of the present invention (the example 1) is considered to suppress slip also in the center part and to improve traction performance as a result of suppressing slip.

As a result of comparing the example 4 with the example 5, it is apparent that the angle (the circumferential direction standard) of the cords in the inclination belt layer as the auxiliary belt layer is more preferably 90 degrees. In the example 5, the angles of the cords are set to 60 degrees and, therefore, the auxiliary belt layer is hardly extendable more than those of the example 4 in the circumferential direction. Consequently, effects of the present invention becomes less effective but increased the abrasion amount.

Apparently, any tire of the examples to which the present invention is applied provide significant improvement in abrasion resisting performance as compared with the conventional tire. This is an effect provided by distributing uniform shear force inside the tread to suppress local slip. In addition, since slip is suppressed, the grip force is increased so that improvement in stable steering performance is confirmed.

TEST EXAMPLE 2

In order to confirm performance improving effects of the present invention, one kind of tire of the conventional example and four kinds of tire of embodiments to which the present invention is applied are prepared and steering performance comparing tests are carried out with an actual vehicle. An object of the tests relates to the point whether abrasion due to slip at traction is improved and the point whether the present invention results in any decrease in steering stability. For the tests, only the rear tire is exchanged while the conventional front tire is always fixed.

The tests are carried out by mounting a test tire on the rear wheel of a 1000 cc motorcycle of a sport type to carry out rather aggressive traveling with an actual vehicle (close to the limit) on a testing track. On one tire, traveling of ten rounds on the testing track is carried out (for approximately 15 minutes) to investigate the abrasion amount of the tire after traveling. For the abrasion amount, abrasion depth at the site where maximum abrasion occurred in the tread is measured. Strictly, the tire after finishing traveling is cut to measure thickness of the remaining tread rubber and the level of abrasion is measured based on the thickness that is originally present. This circuit is a clockwise circuit and there are a lot of right corners. Therefore, the position undergoing maximum abrasion is near the shoulder of the tread on the right side of the tires for all the tires. In addition, stable steering performance is assessed simultaneously and comprehensively in the ten-point method based on feeling of a test rider. In addition, assessment comments of the test rider are also appended to show the results. Moreover, average lap time is also shown. Here, the size of the test tire is 190/R50Z17.

CONVENTIONAL EXAMPLE

Structure: Structure in exception of the cushion rubber layer and the inclination belt layer from the tire illustrated in FIG. 3 and includes only a spiral belt layer as the reinforcing layer outside the carcass. Tread thickness from the spiral belt layer to the tread surface is 6.0 mm.
Tire weight: 6.2 kg
Maximum abrasion amount: 2.1 mm
Lap time average: 1 minute 41.3 seconds
Assessment score on stable steering: 5 points
Comments of rider: Gradual abrasion in the shoulder is probably going on as repeating round. In the ninth round and the tenth round, grip force at the time of inclining the body obviously dropped. Occurrence of traction results in slip to idle the rear tire.

EXAMPLE 1

Structure: FIG. 3. Average thickness of the cushion rubber layer in the center side region is 1.0 mm. Average thickness of the cushion rubber layer in the shoulder side region is 3.0 mm. Thickness of the tread is 6.0 mm.
Tire weight: 7.7 kg
Maximum abrasion amount: 1.0 mm
Lap time average: 1 minute 35.3 seconds
Assessment score on stable steering: 8 points
Comments of rider: Grip force was highly perceptible from the initial period. Assumingly, the tire slipped little to consequently provide good grip. The tire seemed to grip firmly against lateral force also during cornering. Gradual abrasion is probably going on as repeating round, thereby dropping the grip force. But the drop percentage of grip was extremely small. During the ten rounds, stable traveling was feasible. In addition, also during straight traveling, traction grip in the vertical direction was good. However, assumingly due to heaviness, responsiveness is slightly bad.

EXAMPLE 2

Structure: FIG. 3. Average thickness of the cushion rubber layer in the center side region is 0.2 mm. Average thickness of the cushion rubber layer in the shoulder side region is 3.0 mm. Thickness of the tread is 6.0 mm.
Tire weight: 7.3 kg
Maximum abrasion amount: 1.0 mm
Lap time average: 1 minute 34.3 seconds
Assessment score on stable steering: 9 points
Comments of rider: In addition to likewise achievement of the example 1, handling is better than that of the example 1. The tire was felt light and responsiveness was better than that of the example 1. Therefore, the motorcycle could be inclined promptly.

EXAMPLE 3

Structure: Average thickness of the cushion rubber layer in the center side region is 3.0 mm. Average thickness of the cushion rubber layer in the shoulder side region is 3.0 mm (thickness of the cushion rubber layer cushion rubber layer is constant). Thickness of the tread is 6.0 mm.
Tire weight: 8.4 kg
Maximum abrasion amount: 1.0 mm
Lap time average: 1 minute 35.9 seconds
Assessment score on stable steering: 7 points
Comments of rider: In spite of likewise achievement of the example 1, tire was felt extremely heavy and responsiveness of the body was bad.

EXAMPLE 4

Structure: FIG. 3. Average thickness of the cushion rubber layer in the center side region is 1.0 mm. Average thickness of the cushion rubber layer in the shoulder side region is 4.0 mm. Thickness of the tread is 6.0 mm.
Tire weight: 8.0 kg
Maximum abrasion amount: 0.8 mm
Lap time average: 1 minute 36.2 seconds
Assessment score on stable steering: 7 points
Comments of rider: In spite of likewise achievement of the example 1, tire was felt heavy. In addition, when the body is inclined, a little lateral limpness is felt.

EXAMPLE 5

Structure: FIG. 3. Average thickness of the cushion rubber layer in the center side region is 1.0 mm. Average thickness of the cushion rubber layer in the shoulder side region is 5.0 mm. Thickness of the tread is 6.0 mm.
Maximum abrasion amount: 0.8 mm
Lap time average: 1 minute 39.7 seconds
Assessment score on stable steering: 5 points
Comments of rider: When the body is inclined, a lateral limpness was felt and a sense of stability for the body was missing.
(Validation on Results)
As compared with the conventional example, any of the examples 1 to 4 attain good stable steering performance without many abrasion amounts. That is, the cushion rubber layer and the inclination belt layer arranged thereon are apparently effective for reducing slip.

As compared with the example 1 and the example 3, by making the cushion rubber layer thinner in the center side region than in the shoulder side region, the tire weight can be apparently made light to move the vehicle quickly. In addition, as in the example 2, by making thickness of the cushion rubber layer as thinner as possible to 0.2 mm in the center side region, the effect can be apparently increased further.

Moreover, based on comparison among the example 1, the example 3 and the example 5, too thick cushion rubber layer in the shoulder side region apparently results in spoiling stable steering performance.

Any tire of the embodiment apparently balances improvement in abrasion resisting performance and improvement in stable steering performance at a high level. This is attained by making shear force distribution uniform in the tread and by the effect of suppressing local slip and the effect of making tire weight as light as possible.

The invention claimed is:

1. A pneumatic tire for a motorcycle comprising a bead core buried in a left-right pair of bead parts,
   a carcass made of not less than one sheet of carcass ply straddling in a troid state from one bead part to the other bead part with end portions being latched by the bead core,
   at least one sheet of spiral belt layer arranged outside the carcass in the tire radial direction with a band form including one or a plurality of cords arranged in parallel, buried in coating rubber and wound spirally,
   tread rubber arranged further outside the spiral belt layer in the tire radial direction to form a tread part contacting the road surface,
   not less than one auxiliary belt layer arranged between the spiral belt layer and the tread rubber, the auxiliary belt layer including a plurality of cords being inclined at 45 to 90 degrees to the circumferential direction of the tire and buried in the coating rubber,
   a cushion rubber layer arranged between the spiral belt layer and the auxiliary belt layer, and
   a main intersecting layer comprising a plurality of belt plies with a plurality of second cords mutually arranged in parallel and buried in coating rubber, with mutually adjacent belt plies having the second cords being inclined for a tire equatorial plane in mutually opposite directions and arranged in the inner side in the tire radial direction of the spiral belt layer.

2. The pneumatic tire for a motorcycle according to claim 1, wherein the cord in the auxiliary belt layer is an organic fiber cord.

3. The pneumatic tire for a motorcycle according to claim 1, wherein a thickness of the cushion rubber layer is set to within a range of 0.5 to 4.0 mm.

4. The pneumatic tire for a motorcycle according to claim 1, wherein an elastic modulus of the cushion rubber layer is smaller than an elastic modulus of the tread rubber.

5. The pneumatic tire for a motorcycle according to claim 1, wherein
   the auxiliary belt layer is arranged only on the both sides of the tread so as not to be arranged on the tread center side and
   the auxiliary belt layer is arranged within a range of 0.2 to 0.6L at least from the tread end to the tire equatorial plane side and is not arranged 0.6L closer to the tire equatorial plane side from the tread end to the tire equatorial plane side, L being a tread half width from the tire equatorial plane to the tread end obtained by measuring the tread part along the tread surface.

6. A pneumatic tire for a motorcycle comprising a bead core buried in a left-right pair of bead parts,
- a carcass made of not less than one sheet of carcass ply straddling in a troid state from one bead part to the other bead part with end portions being latched by the bead core,
- at least one sheet of spiral belt layer arranged outside the carcass in the tire radial direction with a band form including one or a plurality of cords arranged in parallel, buried in coating rubber and wound spirally,
- tread rubber arranged further outside the spiral belt layer in the tire radial direction to form a tread part contacting the road surface,
- not less than one auxiliary belt layer arranged between the spiral belt layer and the tread rubber, the auxiliary belt layer including a plurality of cords being inclined at 45 to 90 degrees to the circumferential direction of the tire and buried in the coating rubber,
- a cushion rubber layer arranged between the spiral belt layer and the auxiliary belt layer, and
- a main intersecting layer comprising a plurality of belt plies with a plurality of second cords mutually arranged in parallel and buried in coating rubber, with mutually adjacent belt plies having the second cords being inclined for a tire equatorial plane in mutually opposite directions and arranged between the spiral belt layer and cushion rubber layer.

7. A pneumatic tire for a motorcycle comprising a bead core buried in a left-right pair of bead parts,
- a carcass made of not less than one sheet of carcass ply straddling in a troid state from one bead part to the other bead part with end portions being latched by the bead core,
- at least one sheet of spiral belt layer arranged outside the carcass in the tire radial direction with a band form including one or a plurality of cords arranged in parallel, buried in coating rubber and wound spirally,
- tread rubber arranged further outside the spiral belt layer in the tire radial direction to form a tread part contacting the road surface,
- not less than one auxiliary belt layer arranged between the spiral belt layer and the tread rubber, the auxiliary belt layer including a plurality of cords being inclined at 45 to 90 degrees to the circumferential direction of the tire and buried in the coating rubber, and
- a cushion rubber layer arranged between the spiral belt layer and the auxiliary belt layer,
- wherein Ds>Dc is fulfilled, Ds being average thickness from the spiral belt layer to the auxiliary belt layer in a shoulder side region, which is the closest to the tread end among trisected regions when the tread surface from the tire equatorial plane to the tread end is trisected; and Dc being average thickness from the spiral belt layer to the auxiliary belt layer in a center side region, which is the closest to the tire equatorial plane among the trisected regions.

8. The pneumatic tire for a motorcycle according to claim 7, wherein a thickness of the cushion rubber layer in the shoulder side region is set to within a range of 0.5 to 4.0 mm.

9. The pneumatic tire for a motorcycle according to claim 7, wherein a thickness of the cushion rubber layer in the center side region is set to less than 0.5 mm.

* * * * *